J. F. SCHNEIDER.
VULCANIZER.
APPLICATION FILED APR. 28, 1916.
1,277,265.
Patented Aug. 27, 1918.
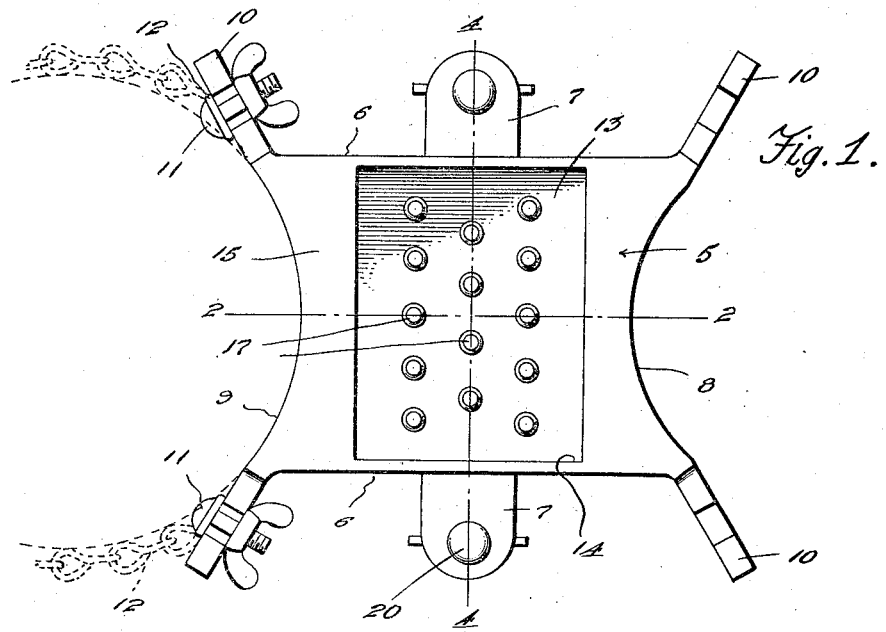
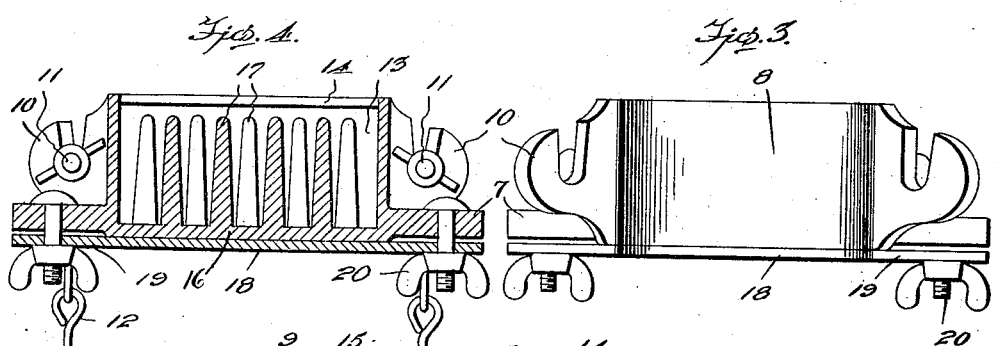
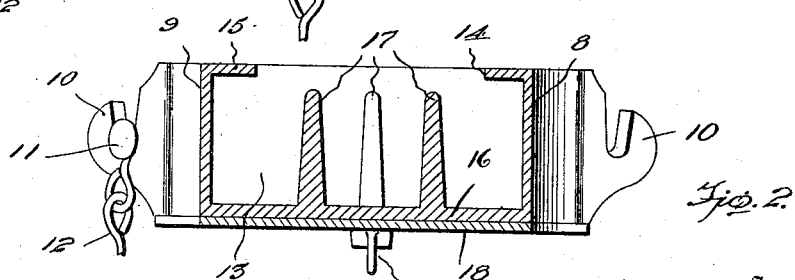
Inventor
John F. Schneider.
Witness
By John Louis Waters & Co.
Attorney

UNITED STATES PATENT OFFICE.

JOHN F. SCHNEIDER, OF ST. LOUIS, MISSOURI.

VULCANIZER.

1,277,265.  Specification of Letters Patent.  Patented Aug. 27, 1918.

Application filed April 28, 1916. Serial No. 94,197.

*To all whom it may concern:*

Be it known that I, JOHN F. SCHNEIDER, a citizen of the United States, residing at St. Louis, State of Missouri, have invented certain useful Improvements in Vulcanizers, of which the following is a specification, reference being had therein to the accompanying drawing.

This invention relates to improvements in portable tire vulcanizers, one object of the invention being the provision of a gasolene vulcanizer of a type that is adapted to be attached to the outer casing of an auto tire and which will operate upon casings of various sizes.

A further object of this invention is the provision of a vulcanizer of this type which may be operated in the wind without danger of the same being blown out.

A still further object of this invention is the provision of a simple, durable and inexpensive device of this type which is thoroughly efficient and practical in use.

In the accompanying drawings:

Figure 1 is a top plan view of the vulcanizer, dotted lines indicating the position of the outer casing of a tire relative thereto.

Fig. 2 is a section taken on line 2—2 thereof.

Fig. 3 is an end view taken from one of the concaved ends of the vulcanizer.

Fig. 4 is a section taken on line 4—4 of Fig. 1.

Referring to the drawings, the numeral 5 designates the body of the vulcanizer which is provided with the two parallel walls 6 having formed integral therewith the outstanding apertured lugs 7, while the two opposite walls 8 and 9 are concaved to fit upon the exterior of the outer casing of an automobile tire, one of the concaves being of greater depth than the other and adapted to be used upon a small outer casing.

Formed integral with and extending from the extreme corners of the concaved walls are the apertured lugs 10 for the reception of the attaching bolts 11 of the chain 12, which is adapted to surround the rim of the wheel carrying the tire to hold the present vulcanizer with one of the concaved walls in engagement with the outer casing.

Formed in the body of the present vulcanizer is the receptacle 13 which follows the general contour of the parallel and concaved walls and is provided with the rectangular outlet 14 in the upper wall 15 thereof.

Formed integral with the bottom 16 of the receptacle and projecting upwardly therefrom are the heat transmitting pins or projections 17.

When the present device is used for vulcanizing tubes, the relatively thin plate 18 which is substantially the shape of the main body portion of the vulcanizer is provided and has the apertured lugs 19, being adapted to aline with the lugs 7 to receive the clamping bolts 20.

What I claim as new is:

A vulcanizer comprising an imperforate bottom having an outer flat heating face, oppositely arranged flat sides at a right angle to said bottom, other opposite arcuate walls connecting the flat sides and also extending at a right angle to the bottom, said arcuate walls having concaved outer faces described on arcs of different radii, a wall in spaced parallel relation to the bottom having an aperture of smaller dimensions than the wall in which it is formed leaving fuel pockets bounded at one side by said arcuate wall, and attaching ears at the four corners of the body of the vulcanizer.

In testimony whereof I affix my signature.

JOHN F. SCHNEIDER.

Copies of this patent may be obtained for five cents each, by addressing the "Commissioner of Patents, Washington, D. C."